United States Patent
Jaure

(10) Patent No.: US 10,373,520 B1
(45) Date of Patent: Aug. 6, 2019

(54) AUTOMATED OPTIMAL GOLF, TENNIS AND BASEBALL SWING ANALYSIS AND TEACHING METHOD

(76) Inventor: Paul Jaure, Miami, FL (US)

( * ) Notice: Subject to any disclaimer, the term of this patent is extended or adjusted under 35 U.S.C. 154(b) by 0 days.

(21) Appl. No.: 13/472,592

(22) Filed: May 16, 2012

Related U.S. Application Data

(60) Provisional application No. 61/501,503, filed on Jun. 27, 2011.

(51) Int. Cl.
G09B 19/00 (2006.01)
A63B 69/36 (2006.01)

(52) U.S. Cl.
CPC ...... *G09B 19/0038* (2013.01); *A63B 69/3641* (2013.01); *A63B 69/36* (2013.01); *G09B 19/00* (2013.01)

(58) Field of Classification Search
CPC .. A63B 69/36; A63B 69/3641; G09B 19/0038
USPC .......................... 434/247, 252, 257, 258, 261
See application file for complete search history.

(56) References Cited

U.S. PATENT DOCUMENTS

| | | | |
|---|---|---|---|
| 5,984,684 A * | 11/1999 | Brostedt et al. | 434/252 |
| 6,042,492 A * | 3/2000 | Baum | 473/453 |
| 6,159,016 A * | 12/2000 | Lubell et al. | 434/247 |
| 6,293,802 B1 * | 9/2001 | Ahlgren | 434/252 |
| 6,408,128 B1 * | 6/2002 | Abecassis | 386/239 |
| 6,514,081 B1 * | 2/2003 | Mengoli | 434/252 |
| 6,786,730 B2 * | 9/2004 | Bleckley et al. | 434/247 |
| 7,311,611 B2 * | 12/2007 | Cameron et al. | 473/221 |
| 7,502,491 B2 * | 3/2009 | Shirai et al. | 382/107 |
| 2002/0155417 A1 * | 10/2002 | Browne et al. | 434/257 |
| 2003/0008731 A1 * | 1/2003 | Anderson et al. | 473/407 |
| 2004/0162154 A1 * | 8/2004 | DeJohn | 473/266 |
| 2005/0013467 A1 * | 1/2005 | McNitt | 382/107 |
| 2005/0272517 A1 * | 12/2005 | Funk et al. | 473/222 |
| 2007/0135225 A1 * | 6/2007 | Nieminen et al. | 473/212 |
| 2009/0042661 A1 * | 2/2009 | Cheng | 473/266 |
| 2010/0261146 A1 * | 10/2010 | Kim | 434/252 |
| 2011/0276153 A1 * | 11/2011 | Seiner | 700/91 |
| 2013/0045817 A1 * | 2/2013 | Irwin | 473/279 |

* cited by examiner

*Primary Examiner* — Samchuan C Yao
*Assistant Examiner* — Michael C Humphrey
(74) *Attorney, Agent, or Firm* — Malloy & Malloy, P.L.

(57) ABSTRACT

A method for automatically analyzing and teaching optimal sport swings to users having the steps of: a user records a swing video of the user's sports swing with a video recorder or mobile device; the user uploads the swing video to an internet portal; the user answers a questionnaire on the internet portal; video recognition software on the internet portal uses an algorithm to compare the swing video to pre-established swing parameter values and to analyze and determine errors in the swing; the internet portal prepares a swing analysis explanation, a swing error explanation, a swing correction explanation, and pre-recorded video guides; and the internet portal sends the swing analysis explanation, the swing error explanation, the swing correction explanation, and pre-recorded video guides to the user.

1 Claim, 1 Drawing Sheet

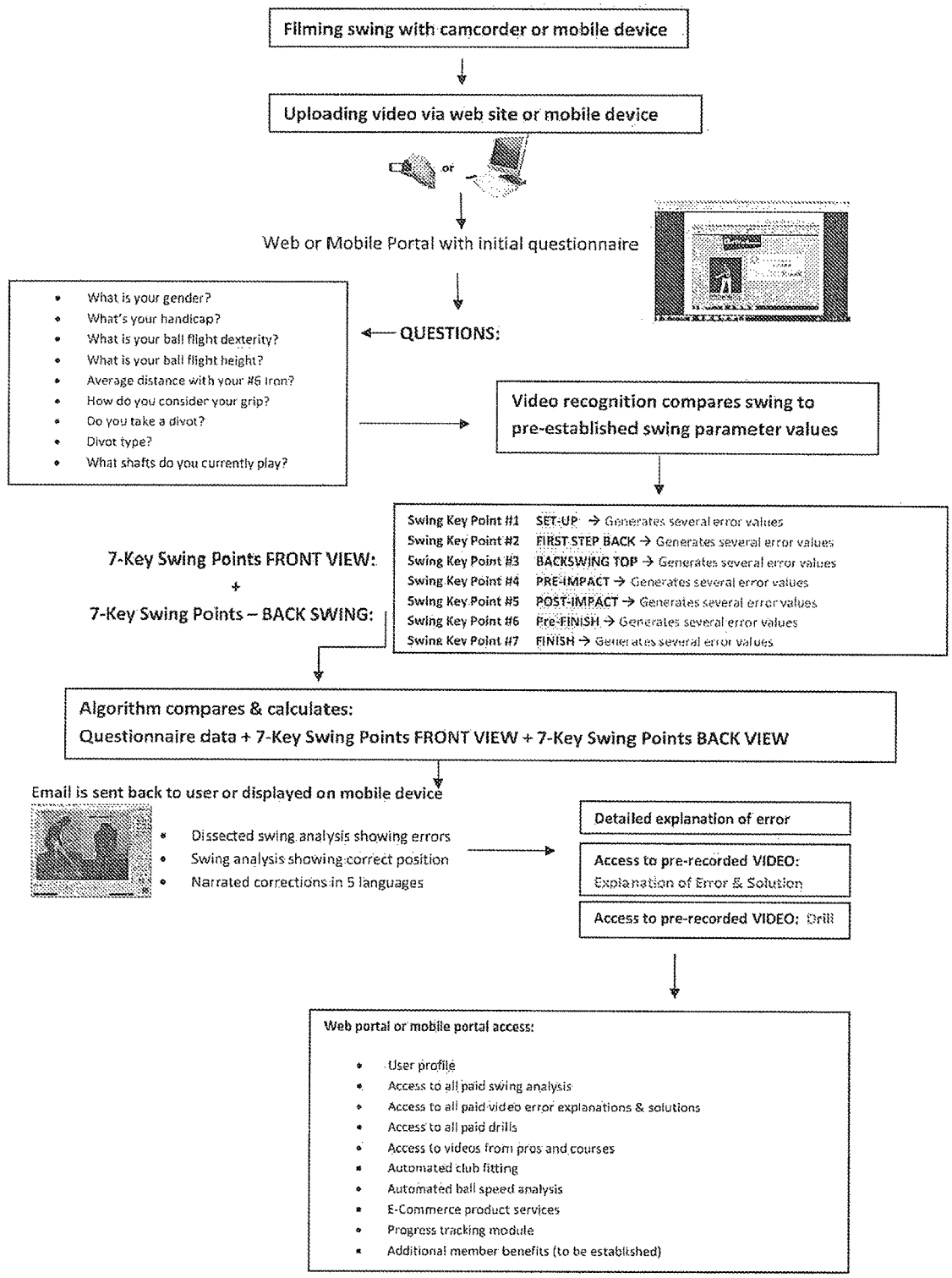

AUTOMATED OPTIMAL GOLF, TENNIS AND BASEBALL SWING ANALYSIS AND TEACHING METHOD

OTHER RELATED APPLICATIONS

The present application is a U.S. Non-Provisional Patent Application of Provisional Application No. 61/501,503, filed on Jun. 27, 2011, which is hereby incorporated by reference.

BACKGROUND OF THE INVENTION

1. Field of the Invention

The present invention relates to method for automatically analyzing and teaching optimal sport swings to users.

2. Description of the Related Art

Applicant is not aware of any prior art suggesting the novel features of the present invention.

SUMMARY OF THE INVENTION

The instant invention is a method for automatically analyzing and teaching optimal sport swings to users comprising the steps of: a user records a swing video of the user's sports swing with a video recorder or mobile device; the user uploads the swing video to an internet portal; the user answers a questionnaire on the internet portal; video recognition software on the :Internet portal uses an algorithm to compare the swing video to pre-established swing parameter values and to analyze and determine errors in the swing; the internet portal prepares a swing analysis explanation, a swing error explanation, a swing correction explanation, and pre-recorded video guides; and the internet portal sends the swing analysis explanation, the saving error explanation, the swing correction explanation, and pre-recorded video guides to the user.

It is therefore one of the main objects of the present invention to provide an automated optimal golf, tennis and baseball swing analysis and teaching method for automatically analyzing and teaching optimal sport swings to users.

It is another object of this invention to provide an automated optimal golf, tennis and baseball swing analysis and teaching method that may be used to analyze and correct golf swings, tennis swings, baseball swings, and other similar sports swing motions.

It is another object of this invention to provide an automated optimal golf, tennis and baseball swing analysis and teaching method that comprises a video recognition software to compare the swing video to pre-established swing parameter values and to analyze and determine errors in the swing.

It is another object of this invention to provide an automated optimal golf, tennis and baseball swing analysis and teaching method that returns a swing analysis explanation, a swing error explanation, a swing correction explanation, and a pre-recorded video guides and send them to the user.

It is yet another object of this invention to provide such a method that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawing in which:

FIG. 1 is a software flow chart diagram of a method. according to an embodiment of the current invention.

DETAILED DESCRIPTION OF THE PREFERRED EMBODIMENT

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method for automatically analyzing and teaching optimal sport swings to users. The method may be used to analyze and correct golf swings, tennis swings, baseball swings, and other similar sports swing motions. In one exemplary embodiment, a user first records a swing video of the user's sports swing with a video recorder. The user then uploads the swing video to an internet portal. The user then answers a questionnaire on the internet portal. Video recognition software on the internet portal then uses an algorithm to compare the swing video to pre-established swing parameter values and to analyze and determine errors in the swing. The internet portal then returns a swing analysis explanation, a swing error explanation, a swing correction explanation, and a pre-recorded video guides and send them to the user.

In one embodiment, the video recognition software uses data from. the questionnaire answers and the swing video to prepare a swing analysis explanation, a swing error explanation, and a swing correction explanation. In one embodiment, the algorithm may select the swing correction explanation from a set of pre-established solutions, explanations, and drills.

It should be understood, of course, that the foregoing relates to exemplary embodiments of the invention and that modifications may be made without departing from the spirit and scope of the invention as set forth in the following claims.

What is claimed is:

1. A method for automatically analyzing and teaching optimal golf swings to a user comprising the steps of:
   A) filming a swing video of the user's golf swing with a mobile device comprising a video camera;
   B) uploading the swing video via an internet portal;
   C) answering a questionnaire via the internet portal, including at least the user's gender, handicap, ball flight dexterity, ball flight height, average distance of ball travel when hit with a 6 iron, grip, divot type and identification shafts played, to create data;
   D) using automated video recognition software accessible via the internet portal having an algorithm taking said data into account to compare the swing video to pre-established swing parameter values and to analyze and determine errors in the swing, whereby said video recognition software analyses views that capture parts of a golf swing from start to end to compare to said set of pre-established swing parameter values, wherein said algorithm comprises said set of pre-established swing parameter values to calculate seven swing key points consisting of set-up, first step back, backswing top, pre-impact, post-impact, pre-finish, and finish to generate error values;

E) preparing a swing analysis explanation, a swing error explanation, a swing correction explanation, and pre-recorded video guides from a set of pre-established swing parameter values, whereby said algorithm compares and calculates said data, and said seven swing key points consisting of said set-up, said first step back, said backswing top, said pre-impact, said post-impact, said pre-finish, and said finish to produce dissected swing analysis showing errors and swing analysis showing correct position; and F) sending the swing analysis explanation, the swing error explanation, the swing correction explanation, and pre-recorded video guides to the user.

* * * * *